E. C. HANSON.
APPARATUS ON AIRCRAFT FOR RECEIVING AND DELIVERING MAIL AND MERCHANDISE.
APPLICATION FILED MAY 19, 1920.
1,347,157.
Patented July 20, 1920.
3 SHEETS—SHEET 1.
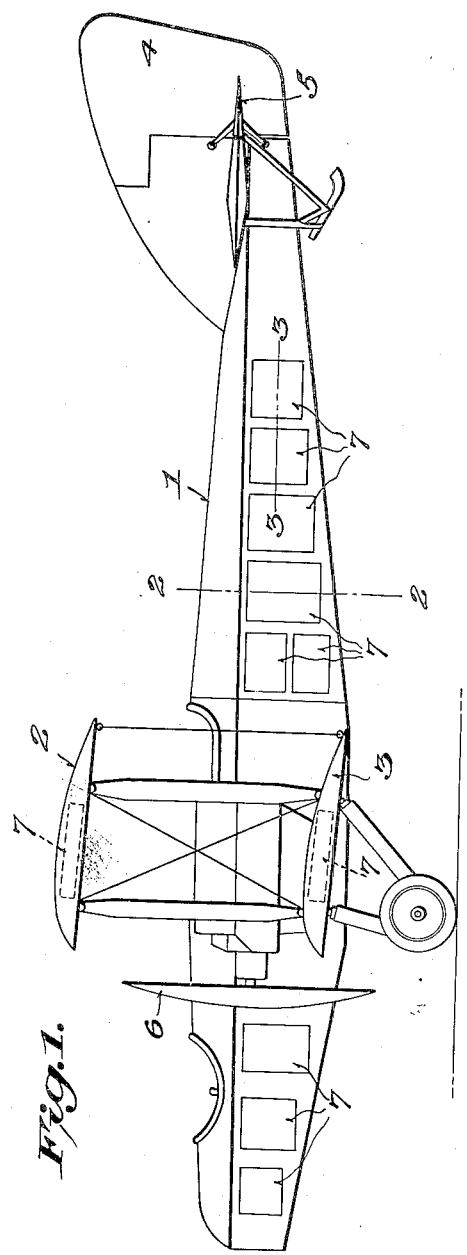
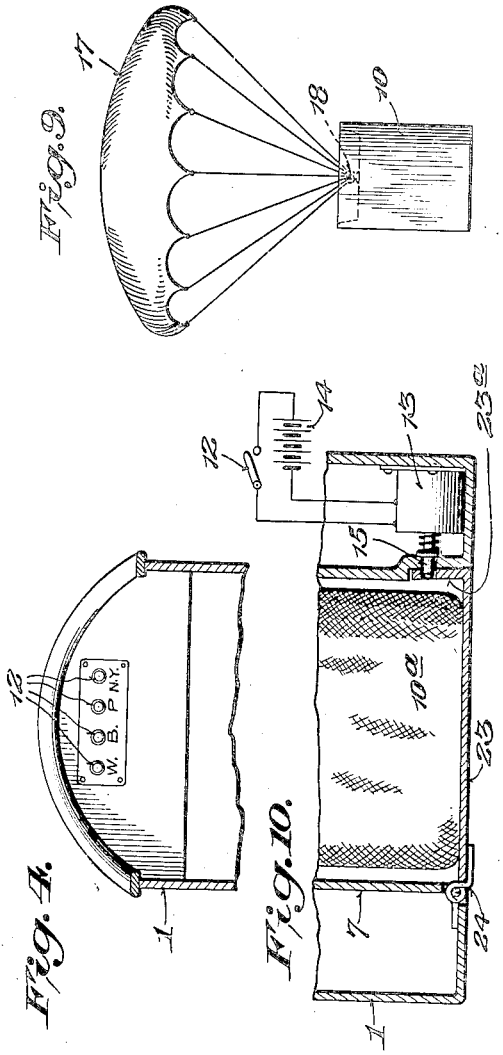
Inventor
Earl C. Hanson
WITNESSES:—

E. C. HANSON.
APPARATUS ON AIRCRAFT FOR RECEIVING AND DELIVERING MAIL AND MERCHANDISE.
APPLICATION FILED MAY 19, 1920.
1,347,157.
Patented July 20, 1920.
3 SHEETS—SHEET 2.
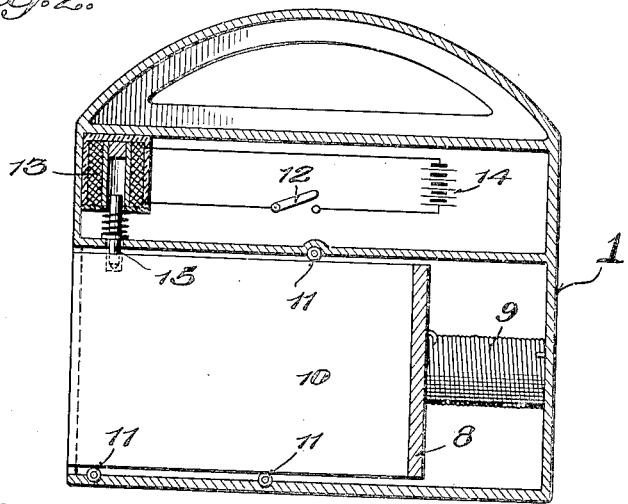
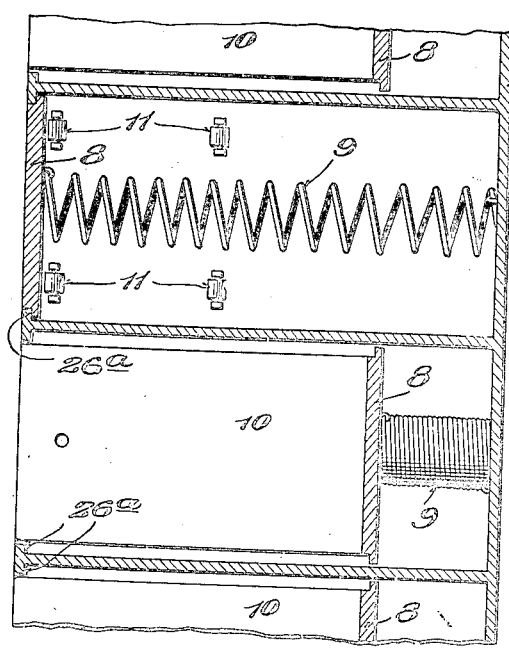
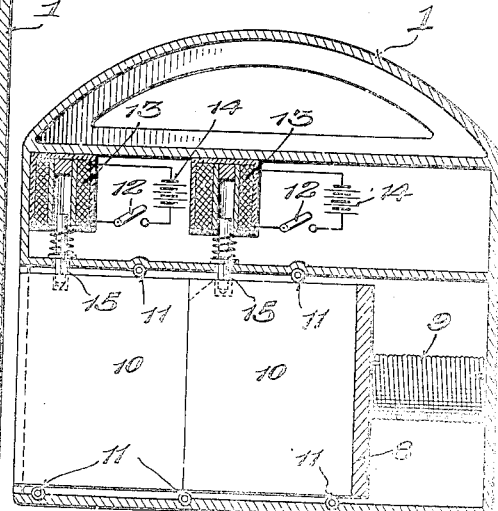

E. C. HANSON.
APPARATUS ON AIRCRAFT FOR RECEIVING AND DELIVERING MAIL AND MERCHANDISE.
APPLICATION FILED MAY 19, 1920.
1,347,157.
Patented July 20, 1920.
3 SHEETS—SHEET 3.
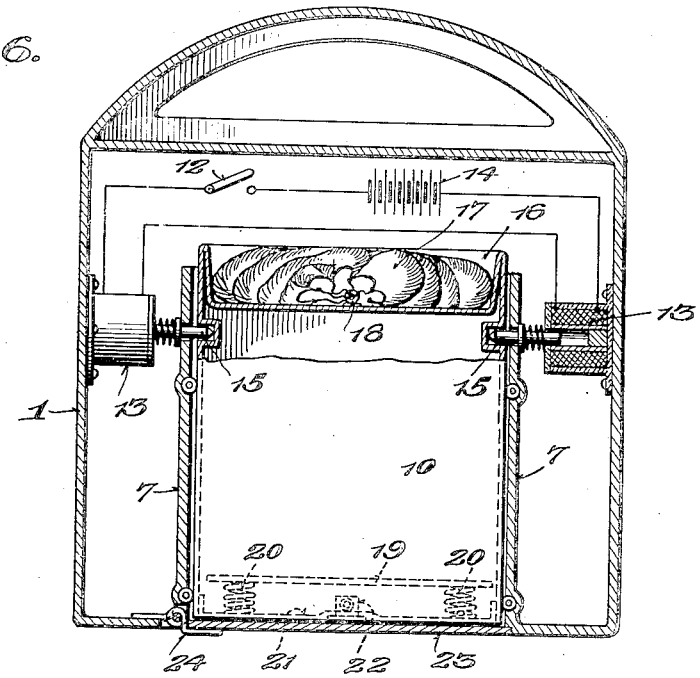
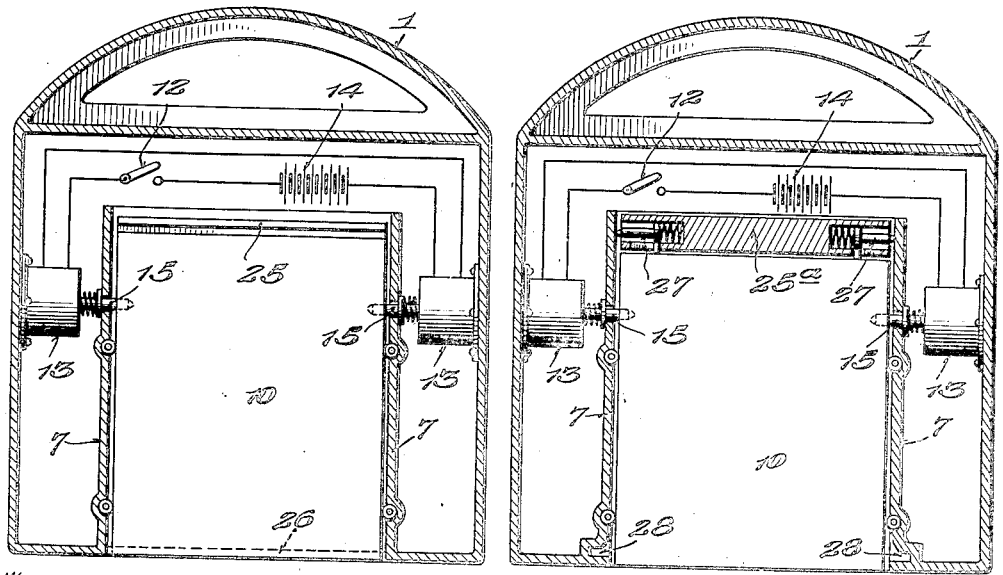

UNITED STATES PATENT OFFICE.

EARL C. HANSON, OF WASHINGTON, DISTRICT OF COLUMBIA.

APPARATUS ON AIRCRAFT FOR RECEIVING AND DELIVERING MAIL AND MERCHANDISE.

1,347,157. Specification of Letters Patent. Patented July 20, 1920.

Application filed May 19, 1920. Serial No. 382,646.

*To all whom it may concern:*

Be it known that I, EARL C. HANSON, a citizen of the United States, residing at Washington, in the District of Columbia, have invented certain new and useful Improvements in Apparatus on Aircraft for Receiving and Delivering Mail and Merchandise, of which the following is a specification.

My invention relates to aircraft and particularly to means for carrying and delivering merchandise, particularly mail matter and other parcels, with convenience to the operator and safety to the matter carried.

This application is a continuation of the application filed April 13, 1920, Serial No. 373,585, with additional matter added thereto.

By reason of the construction and arrangement hereinafter set forth the merchandise, mail matter or parcels are prevented from shifting while in flight, thereby maintaining the normal centers of pressure, lift and gravity, and adding to the safety of the aviator.

Another object in view is to provide means under the control of the aviator or other occupant of the craft which will enable him to release or discharge mail matter or other merchandise without moving from his position.

A further object is to provide suitable means for insuring the safe descent of the mail matter or packages.

A still further object of the invention is to preserve the streamline formation of the fuselage of the machine both prior to and after the discharge of such packages, mail matter or other merchandise.

In the accompanying drawings:—

Figure 1 is a side elevation of an aircraft showing the improvement.

Fig. 2 is a section on the line 2—2 of Fig. 1 on an enlarged scale, showing the package holding and ejecting means.

Fig. 3 is a horizontal section on the line 3—3 of Fig. 1.

Fig. 4 is a vertical cross section through the fuselage looking toward the control board.

Fig. 5 is a vertical cross section through the fuselage showing the use of two packages or containers in a single compartment with means for holding and ejecting the same one at a time, and also closing the discharge end of said compartment.

Fig. 6 is a similar view showing another way of mounting a container and holding and releasing the same.

Fig. 7 is a modified construction showing the use of a gravity closure or follower and means similar to that shown in Fig. 3 for holding the follower flush with the outer surface of the fuselage.

Fig. 8 is a further modification showing means for locking the follower in its outward position.

Fig. 9 is a side elevation of one of the containers showing the means for insuring the safe landing thereof.

Fig. 10 is a further modification showing the use of a package without a container.

Referring to the drawings 1 designates a fuselage or body of an airplane, 2 and 3 the supporting surfaces, 4 the vertical rudder, 5 the elevator, and 6 the propeller.

Under the arrangement shown in Fig. 1 the fuselage is formed with compartments 7 opening laterally thereof and normally closed by suitable means such as doors or followers. Each of said compartments is adapted to contain any form of merchandise, mail matter or parcels.

In order to prevent the mail matter or parcels from shifting in their respective compartments 7, springs 9 are arranged in the compartments to bear against the doors or followers 8, as shown in Figs. 2, 3 and 5. By referring to these figures it will be seen that ejector springs 9 are placed behind the followers 8 and the latter mounted between anti-friction rollers 11 to insure free movement thereof. Under normal conditions each container 10 is held securely in place by any suitable locking or holding means, the locking means being at all times under the control of the aviator. While there are many ways of holding and releasing the containers, I have illustrated in Figs. 2 and 5 electrical releasing means enabling the operator from his seat, by manipulation of switches 12 to release the respective containers or packages. Upon closure of the switch 12, the solenoid 13 is energized by battery 14 which retracts the armature 15 that holds and latches the respective containers in place. Thereupon the spring 9 acts to eject the container.

Two or more containers or packages may be arranged in a single compartment as shown in Fig. 5 and held by independent means such as above described, thus providing for ejecting such packages or containers one after another at different intervals.

Fig. 6 illustrates a simple way of holding and releasing a container 10. In this instance the compartment 7 for the container is open at the bottom of the fuselage to enable the container to fall by gravity when released.

The holding and releasing means may be of any kind, being shown as of the same type as described in connection with Figs. 2 and 5.

In Fig. 6 two of said holding and releasing devices are shown arranged opposite each other but both are to be connected in the same electric circuit, as shown in said Fig. 6, so as to be simultaneously operable. One end of the container 10 is shown as formed with a recess or depression 16 containing a folded or collapsed parachute 17 attached permanently to the container at 18. After the container 10 is dropped from the aircraft the parachute opens and insures a safe descent of the container to the ground. Any means may be used for automatically opening the parachute after the container has been discharged.

It may be desirable to provide means for preventing shifting of mail or other matter in the container and also to act as a shock absorber when the container strikes any receiving means on the landing field. This is shown in Fig. 6 as comprising a platform 19 supported by springs 20 secured on a closure or lid forming a part of the container, as shown at 21, said lid being locked in normal position by means of the lock 22.

After the container is ejected the discharge end of the compartment is closed by a streamline door 23 normally held closed by a spring hinge 24 and which swings open to permit discharge of the container.

In Fig. 7 I have shown the use of a gravity follower 25 which, upon the discharge of the container 10 moves downwardly, resting against shoulders or ledges 26 similar to those shown at 26ᵃ in Fig. 3. These sustain the follower in position to preserve the streamline formation of the fuselage. The follower may be made as shown at 25ᵃ in Fig. 8 providing the same with spring thrust catches or pins 27 which will engage notches 28 in opposite sides of the compartment to lock said follower in streamline position after the container or package has been discharged.

Fig. 10 is a modification of the form shown in Fig. 6 showing a package or mail bag 10ᵃ in one of the compartments without the use of a container.

Heretofore it has been the common practice to carry merchandise and particularly mail matter in mail bags or the like, the latter being placed in the body or fuselage of the machine without due regard for the shifting of such matter and changes in the center of gravity and lift of the machine. The present invention provides for the proper storage of a large quantity of matter in a small space and within the streamline of the fuselage where it will add in no way to the head resistance of the machine. In practice some of the merchandise or mail matter or the like may be arranged in front as well as in rear of the center of lift and the center of gravity and also in the planes as illustrated in Fig. 1. This adds materially to the safety of a machine and the aviator and the safe transportation and delivery of mail or other matter. Furthermore, by reason of the construction described, the aviator may at any time bank the machine and permit the containers to be more readily ejected by calling gravity into play.

It is also contemplated to employ any suitable means to advise the operator whether or not a container or package of matter has been dropped from a machine after the closing of the respective switches. Tell tale lights on the control board could be used for this purpose.

What I claim is:—

1. In an aircraft member having a streamlined surface, a package forming part of the streamlined surface, means to release the package, and means to automatically complete the streamlined surface upon the release of the package.

2. In an aircraft member having a streamline surface, a package forming part of the streamline surface, means to release the package, a second package located within the member, means to bring the second package into position to complete the streamline surface after the first package has been released, means to release the second package after it has been brought into position to complete the streamline surface, and means to automatically complete the streamline surface upon the discharge of the second package.

3. In an aircraft member having a streamlined surface, a package forming part of the streamlined surface, means to prevent shifting of the package, means to release the package, and means to automatically complete the streamlined surface upon the release of the package.

4. In an aircraft member having a streamline surface, a package forming part of the streamline surface, means for preventing shifting of the package, means for holding and releasing the package, a second package located within the member, means to prevent shifting of said second package, means to bring the second package into position to complete the streamline surface after the first package has been released, said package being held in this position and released by the holding and releasing means whereby the first-named package was held and released, and means to automatically complete the streamline surface upon the discharge of the second package.

EARL C. HANSON.